Patented Nov. 17, 1936

2,061,320

UNITED STATES PATENT OFFICE 2,061,320

SOLUTIONS OF BISMUTH SALTS OF CARBOXYLIC ACIDS IN OILS

Friedrich Hampe and Walther Persch, Frankfort-on-the-Main, Germany, assignors to Winthrop Chemical Company, Inc., New York, N. Y., a corporation of New York No Drawing. Application April 17, 1935, Serial No. 16,929. In Germany April 27, 1934

6 Claims. (Cl. 167—68)

The present invention relates to solutions of bismuth salts of carboxylic acids in oils.

The solutions of bismuth salts in oils which are found on the market are generally very sensitive to atmospheric moisture which renders them more or less turbid, this preventing the therapeutic application of the solutions. Attempts have been made to prevent the solutions from becoming turbid by carefully charging them into containers under reduced pressure or in a nitrogen atmosphere.

According to this invention the said turbidities which are obviously due to a dissociation of the salts are avoided by addition of a small quantity of an oil-soluble organic acid, particularly of such an acid having a medium or high molecular weight. The solutions may then be charged into bottles without any particular precaution being necessary. They are stable therein for an unlimited time and even resist temperatures of 40° C. and more for months. The solution may also be allowed to stand at the air or in partly emptied bottles without becoming turbid. If desired, the stabilizers may be dissolved in solvents, such as benzene, and thus be added to the solution in oil, whereupon the solvents are distilled.

Oils suitable for the preparation of the solutions are pharmaceutically indifferent vegetable or animal oils as they are used in medicine for injecting remedies. These oils are in most cases esters of higher fatty acids with more than 15 carbon atoms. There may be used, for instance, olive oil, earth nut oil, beech nut oil, sesame oil, rapeseed oil, bone oil.

Acids forming oil-soluble bismuth salts are in the first line higher-molecular carboxylic acids, and higher-molecular derivatives of lower-molecular carboxylic acids; there are particularly useful hydro-aromatic acids, especially hydro-aromatic endomethylene-benzoic acids as they are enumerated in patent specification No. 1,991,783 dated February 19, 1935, and in the copending application Serial No. 697,078 filed November 7, 1933, in the name of Max Bockmühl, Walter Persch and Gustav Ehrhart. There may furthermore be mentioned camphocarboxylic acid, naphthenic acid, abietinic acid, carboxylic acids of terpenes, amylmalonic acid mono-ethylester, undecylmalonic acid monoethylester.

As acids which are added in small quantities to the solutions in oil there may be used camphor ester acids, phthalic acid monobenzylester, succinic acid monobenzylester, anthranilic acid, palmitic acid, stearic acid, alpha-hydroxystearic acid, oleic acid, salicylic acid, acetylsalicylic acid, tetrahydrobenzoic acid, i. e. aromatic, hydroaromatic and higher aliphatic carboxylic acids which are soluble in oil. Lower-molecular, particularly aliphatic acids are not suitable since they are generally too strong.

The oil solutions may contain per 100 parts of oil about 2 to 40 parts of the bismuth salt and about 0.5 part to 1.3 parts of the oil-soluble carboxylic acid.

The following examples illustrate the invention:

1. To a 10% solution of the bismuth salt of camphocarboxylic acid in olive oil there is added 0.5 per cent (calculated upon the oil) of salicylic acid. The solution is clear and stable.

2. To a solution of 10% strength of the bismuth salt of naphthenic acid in olive oil 1 per cent of acetylsalicylic acid is added.

3. To a 10% solution of the bismuth salt of camphenilanic acid in olive oil 1 per cent of alpha-hydroxystearic acid is added.

4. To the bismuth salt solution indicated in Example 3 there is added 0.5 per cent of salicylic acid or 1 per cent of tetrahydrobenzoic acid.

We claim:

1. A composition of matter comprising a bismuth salt of a hydroaromatic carboxylic acid forming bismuth salts soluble in oils, and a small amount of a carboxylic acid soluble in oils and selected from the group consisting of aromatic, hydroaromatic and higher molecular aliphatic carboxylic acids, said compounds being dissolved in a high molecular, organic, fatty, pharmaceutically indifferent oil.

2. A composition of matter comprising about 100 parts of an organic, fatty, pharmaceutically indifferent oil, about 2 to 40 parts of a bismuth salt of a hydroaromatic carboxylic acid forming bismuth salts soluble in oils, and about 0.3 part to 1.5 parts of a carboxylic acid soluble in oils and selected from the group consisting of aromatic, hydroaromatic and high molecular aliphatic acids, the latter compounds being dissolved in the oil.

3. A composition of matter comprising about 100 parts of an organic, fatty, pharmaceutically indifferent oil, about 2 to 40 parts of a bismuth salt of a hydroaromatic endomethylene benzoic acid, and about 0.3 part to 1.5 parts of a carboxylic acid soluble in oils, and selected from the group consisting of aromatic, hydroaromatic and high molecular aliphatic acids, the latter compounds being dissolved in the oil.

4. A composition of matter comprising about 10 parts of the bismuth salt of camphenilanic acid and about 1 part of alpha-hydroxystearic acid, said compounds being dissolved in about 100 parts of olive oil.

5. A composition of matter comprising about 10 parts of the bismuth salt of camphenilanic acid, and about 0.5 part of salicylic acid, said compounds being dissolved in about 100 parts of olive oil.

6. A composition of matter comprising about 10 parts of the bismuth salt of camphocarboxylic acid and about 0.5 part of salicylic acid, said compounds being dissolved in about 100 parts of olive oil.

FRIEDRICH HAMPE.
WALTHER PERSCH.